April 4, 1961   W. A. RINGGER, JR   2,978,591
CONTROL MEANS FOR A STREET LIGHTING SYSTEM
Filed May 5, 1958
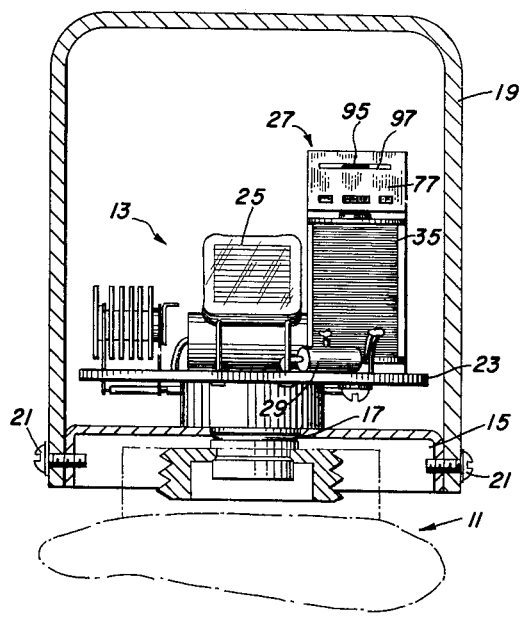
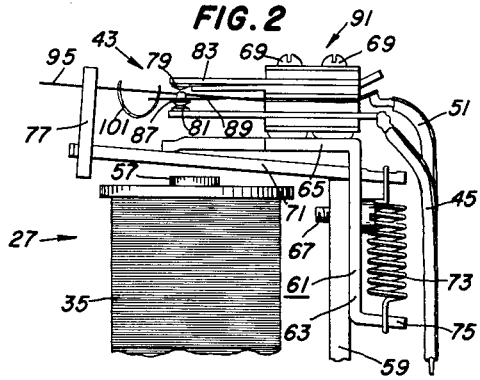
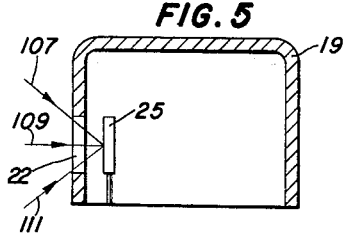
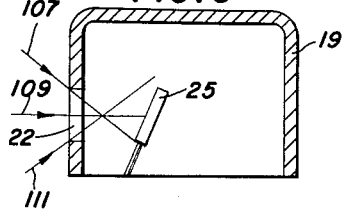
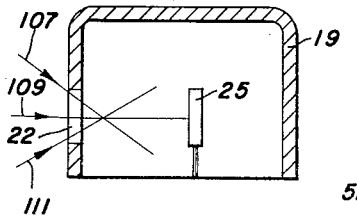
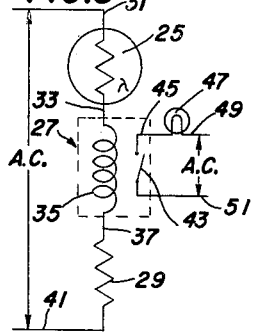
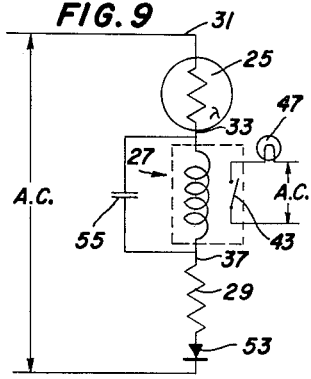
INVENTOR.
WALTER A. RINGGER, JR.
BY John R. Walker, III
Attorney United States Patent Office 2,978,591
Patented Apr. 4, 1961

2,978,591

CONTROL MEANS FOR A STREET LIGHTING SYSTEM

Walter A. Ringger, Jr., Memphis, Tenn., assignor to American Electric Manufacturing Corporation, Memphis, Tenn.

Filed May 5, 1958, Ser. No. 732,882

4 Claims. (Cl. 250—239)

This invention relates to control means for a street lighting system. In particular, it relates to that type of control means in which is used a photoelectric cell that is responsive to changes in light falling thereon to turn the street lamp off in the early morning when the daylight has reached a given intensity and to turn the street lamp on in the evening when a given degree of darkness has been reached.

In this type of control means, there have always been problems due to the fact that an instantaneous switching must be accomplished by a relatively slow change of light. This has caused, among other things, a condition known as "chattering"—that is, a switching back and forth between the "on" and "off" positions when the light change has not been definite enough to cause the switch to remain in the desired position. Also, a condition that has added to the problems in the street lighting field is the fact that when the street lamp is turned on, in the beginning there is an "in-rush" of current because of the cold filament of the lamp. In addition, there have been problems of undesired switching caused by car lights, lightning, and other stray light falling on the photoelectric cell.

Heretofore, in attempting to meet some of the above-mentioned problems, others have tried electronic control means employing tubes. This has not been the ultimate answer since the tubes must remain "on" all of the time and, therefore, fail early. There have been several attempts at a tubeless control, but heretofore none has been completely successful for one reason or another. For example, the use of conventional relays has been tried but, due to the slow change in the operating current, the relays "chatter" and do not operate properly.

Therefore, one of the important objects of the present invention is to provide a tubeless control means for a street lighting system in which a positive switching takes place with no "chattering."

Another object is to provide a control means which is greatly improved in effectiveness and durability over present types of control means.

Another object is to provide such a control means including a snap-acting switch for insuring positive action of the control means.

Another object is to provide, by a unique arrangement of parts, means for cutting down on undesired switching caused by car lights, lightning, and other stray light.

Another object is generally to improve the design and construction of control means for a street lighting system.

The means by which the foregoing and other objects of the present invention are accomplished and the manner of their accomplishment will be readily understood from the following specification upon reference to the accompanying drawings, in which:

Fig. 1 is a view partly in section showing the control means of the present invention mounted on a luminaire.

Fig. 2 is a fragmentary side elevational view of the relay means of the present invention with the snap-acting switch being shown in the closed position.

Fig. 3 is a view similar to Fig. 2 but showing the snap-acting switch in an open position.

Fig. 4 is a top plan view of said relay means.

Fig. 5 is a diagrammatic view showing the usual arrangement of the photoelectric cell relative to the window in the cover.

Fig. 6 is a diagrammatic view of the unique arrangement in accordance with the present invention of the photoelectric cell relative to the window.

Fig. 7 is a view similar to Fig. 6 but showing a modified arrangement in accordance with the present invention of the cell relative to the window.

Fig. 8 is a schematic diagram of the preferred circuit means used in the present invention.

Fig. 9 is a schematic diagram of a modified circuit means.

Fig. 10 is a schematic diagram of still another modified circuit means.

Referring now to the drawings in which the various parts are indicated by numerals, Fig. 1 shows a typical arrangement of the present invention as used in connection with a luminaire 11. As shown in this figure, the device of the present invention, which will be designated in general as control means 13, is mounted on top of the luminaire 11. The luminaire 11 and the specific means for mounting the present invention thereon forms no part of the invention and, therefore, it will not be described in any detail other than to say that any suitable means is provided for rigidly mounting the base 15 of control means 13 on top of the luminaire and plug means 17 is provided for electrically joining control means 13 with the street lighting circuit.

Referring now to the construction of control means 13, a cover 19 is removably held on base 15 as by screws 21 or the like. Cover 19 is provided with a window 22 for the admission of light into the interior of the cover. The various electrical components of control means 13, which will hereinafter be described in detail, are supported inside of cover 19 on a circular insulated stand 23 which is preferably spaced above base 15 in the manner best shown in Fig. 1. Said electrical components preferably comprise in general a cell means 25, relay means 27, and a calibrating resistor 29, which are preferably arranged together in the circuit shown in Fig. 8. Thus, as will be seen in this figure, a lead 31 joins one terminal of cell means 25 with a source of electrical power, not shown. The other terminal of cell means 25 is connected to one end of a lead 33 and the other end of the lead is connected to one end of a coil 35 of relay means 27. The other end of coil 35 is connected by a lead 37 to one end of resistor 29. The other end of resistor 29 is connected by a lead 41 to the source of electrical power heretofore mentioned, whereby forming the control circuit. A switch 43 of relay means 27 is interposed in the lighting circuit of luminaire 11, which lighting circuit includes a lead 45 joining one terminal of switch 43 to an electrical lamp 47. The other terminal of the lamp is connected by a lead 49 to a source of electrical power, not shown. The other terminal of switch 43 is joined to said source of electrical power by a lead 51 to complete the lighting circuit. In most cases, in actual practice, the source of electrical power is the same for said control circuit and said lighting circuit, which source of electrical power comes into the luminaire through the usual street lighting wires leading thereto.

Cell means 25 is any type of suitable photoelectric cell means for energizing coil 35. In the preferred embodiment, cell means 25 is a photoconductive type of cell formed of cadmium sulfide or the like, but cell means 25 may be of the photovoltaic or photoemissive type without departing from the spirit and scope of the present invention. It will be understood that, if a photoemissive type of cell is used, the cell would not be connected to an electrical power source as shown in Figs. 8 and 9; but, instead, the cell, which is indicated as at 52, would be simply connected in series with calibrating resistor 29 and coil 35, as best shown in Fig. 10, since the cell is self-generating. It will be understood that the relay means 27 shown in Fig. 8 employs an A.C.-type of relay, whereas, if a D.C. relay is used the circuit should be modified as shown in Fig. 9, wherein it will be seen a rectifier 53 is connected in series in the circuit and a capacitor 55 is connected in parallel across relay means 27, as shown.

An important part of the present invention resides in the construction of relay means 27 and its relationship with the circuit. Relay means 27, which is diagrammatically represented in Figs. 8, 9, and 10 by the dotted line box, includes, in general, coil 35 and switch 43 and the detailed description of the relay means follows: Coil 35 is preferably supported vertically from circular stand 23 and is provided with the usual core 57 extending axially thereof. Switch 43 is supported above coil 35 by supporting means which preferably comprises an upstanding support 59 mounted from circular stand 23 and a bracket 61 having a vertical portion 63 and a horizontal portion 65 integrally formed with the vertical portion and extending at a substantially right angle from the upper edge thereof. Vertical portion 63 is fixedly secured adjacent the upper end of support 59 as by screws 67, and switch 43 is fixedly mounted on top of horizontal portion 65 as by means of screws 69. A plate 71 is pivotally mounted from bracket 61 for pivot about a substantially horizontal axis for movement between the raised position shown in Fig. 2 and the lowered position shown in Fig. 3. A spring 73 extending between a projection 75 on the lower end of vertical portion 63 and the end of plate 71 to the right as viewed in Figs. 2 and 3 causes the right end of the plate as viewed in these figures to be pulled downwardly, thereby lifting the left end of the plate, which plate is stopped in said raised position by horizontal portion 65. In other words, plate 71 is caused to pivot clockwise as viewed in Fig. 2 until the plate contacts horizontal portion 65. It will be understood that when coil 35 is energized the magnetic attraction thereof urges plate 71 to pivot counterclockwise since the left end of the plate as viewed in Figs. 2 and 3 is drawn downwardly towards core 57. When the magnetic attraction of coil 35 reaches a sufficient degree, plate 71 will be disposed in said lowered position in which the plate is in contact with the upper end of core 57. It will additionally be understood that subsequent reduction of the magnetism of coil 35 will permit the plate to be rotated clockwise by spring 73 until the plate again is disposed in said raised position. An end piece 77 formed of a suitable insulating material is fixedly mounted adjacent the end of plate 71 and projects upwardly therefrom.

Switch 43 is of the snap-acting type. That is, the switch is so arranged that in going from a first switch position to a second switch position it maintains said first switch position up until a definite or dead center position has been passed in the operation of the switch and then it quickly and positively snaps into said second switch position, and likewise in going from said second switch position to said first switch position it maintains said second switch position up until the dead center position has been passed and then snaps into said first switch position. Such a snap-acting switch is shown in the drawings and preferably comprises an upper stationary contact 79 and a lower stationary contact 81 respectively mounted adjacent the end of rigid conductor arms 83, 85. Contacts 79, 81 are spaced apart, and disposed therebetween for alternate contact therewith is an intermediate or movable contact 87 mounted on a resilient conductor arm 89. Rigid conductor arms 83, 85 and resilient conductor arm 89 are supported one above the other in a stack 91 in which the conductors are separated from each other by insulation 93. Stack 91 is held together and onto bracket 61 by screws 69 which extend through aligned apertures in the conductor arms and insulation but do not come in contact with the conductor arms. A resilient actuating arm 95 is also supported from stack 91 adjacent resilient conductor arm 89 and the end of the actuating arm extends through a slot 97 in end piece 77. An opening 99 is provided in actuating arm 95 so that resilient conductor arm 89 may bend upwardly and downwardly therethrough. A resilient U-shaped member 101 extends between actuating arm 95 and resilient conductor arm 89 for operably connecting the actuating arm to the resilient conductor arm. A tab 103 integrally formed with actuating arm 95 extends through a hole in U-shaped member 101 adjacent one end thereof and a similar tab 105 integrally formed on the end of resilient conductor arm 89 extends through a hole in U-shaped member 101 adjacent the other end thereof, whereby providing means for supporting the U-shaped member between actuating arm 95 and resilient conductor arm 89. The electrical connections of snap-acting switch 43 and the circuit are as follows: Lead 51 is connected to resilient conductor arm 89, lead 45 is connected to lower conductor arm 85, and upper conductor arm 83 is not connected since the upper contact 79 thereof acts only as a stop for movable contact 87.

In the operation of relay means 27, when plate 71 is in said raised position heretofore described, movable contact 87 is caused to engage with lower stationary contact 81 to close the switch, as is shown in Fig. 2, and when plate 71 is in said lowered position heretofore described the movable contact is caused to abut upper contact 79, as shown in Fig. 3, in which position the switch is open. The following example will explain more clearly this operation of relay means 27: Suppose, to begin with, there is no magnetic attraction by coil 35, in which case the switch will be in the closed position, as best shown in Fig. 2. This position, of course, will be the position of the relay means during the nighttime and lamp 47 will be on. As morning approaches and the skies become lighter, the light which strikes cell means 25 will cause a gradual decreasing of the resistance of the cell means, if the cell means be of the photoconductive type, so that the resistance of the circuit becomes less, more current flows, and the magnetism of coil 35 gradually increases. This gradual increase slowly pivots plate 71 in a counterclockwise direction as viewed in Figs. 2 and 3, which, in turn, draws actuating arm 95 downwardly. A "dead-center" position of the switch is then reached. It will be understood that this dead-center position of the switch is substantially halfway between that shown in Figs. 2 and 3 and in which resilient conductor arm 89 is substantially in alignment with actuating arm 95—that is, neither above nor below the actuating arm. Continued movement of plate 71 in a counter-clockwise direction causes resilient conductor arm 89 to pass said dead-center position and then the resilient conductor arm quickly snaps upwardly into contact to bring movable contact 87 into positive engagement with upper contact 79, as shown in Fig. 3. From the foregoing, it will be understood that up until the dead-center position is reached the switch remains closed and energy is being stored up in the switch, but once the dead-center position is passed it quickly snaps to the open position to give a positive switching, whereby eliminating any "chattering." When nighttime approaches, the converse of the above operation takes place—that is, the gradual decrease of light on cell means 25 causes a gradual increase in the resistance of the circuit, which causes a gradual lessening of the magnetism of coil 35. As the coil is gradually lessened in magnetism, spring 73 gradually urges plate 71 clockwise as viewed in Figs. 2 and 3, which moves actuating arm 95 upwardly and, in turn, the left end of U-shaped member 101 upwardly until said dead-center position is reached, whereupon resilient conductor arm 89 will quickly snap downwardly into contact with lower contact 81. It will be understood that, by changing the size of calibrating resistor 29, relay means 27 may be caused to operate at any desired degree of light intensity.

Another important feature of the present invention resides in the disposition of cell means 25. In Fig. 5 is shown the disposition in previous types of lighting control means, in which it will be seen cell means 25 is in an upright position adjacent window 22 so that light would fall on the cell means. The three rays of light 107, 109, 111 respectively represent rays of light from the upper sky, rays of light from the sun, and rays of light from autos and the like. With the arrangement of the cell means shown in Fig. 5, it will be understood that not only the desired rays of light, as represented by ray 109, will reach the cell means but also the undesired rays from the upper sky, as represented by ray 107, and the undesired rays from automobiles, as represented by ray 111, reach the cell means. These undesired rays 107, 111 striking the cell means cause unwanted actuation of the control means to turn on the lamp 47, as, for example, at night when lightning occurs in the upper sky or when stray light, such as that of automobile lights, causes the device to actuate. The present invention overcomes the above-mentioned difficulties of undesired light falling on the cell means 25 by an arrangement of the cell means wherein it is inclined rearwardly away from window 22 as shown in Fig. 6, whereupon it will be seen the rays of light 107, 111 do not strike the cell means directly. The inclination of cell means 25 should be sufficient for the majority of the light input to the cell means to enter substantially horizontally. In other words, it is contemplated in the present invention to incline cell means 25 rearwardly away from window 22 so as to minimize the light accumulated thereon other than from a horizontal direction. An alternate arrangement in accordance with the present invention for overcoming the above-mentioned difficulties is an arrangement wherein the cell means is disposed in an upright position in line with window 22 but spaced substantially away from the window so that the rays of light 107, 111 do not fall on the cell means. The relationship of the sizes of cell means 25 and window 22, and the spacing of the cell means from the window are such that the majority of the light input to the cell means enters substantially horizontally. In other words, as in the preferred arrangement, it is contemplated in the alternate arrangement to minimize the light accumulated on cell means 25 other than from a horizontal direction. One example of a proper relationship which accomplishes the purpose of the present invention is shown in Fig. 7 wherein the vertical dimensions of window 22 and cell means 25 are substantially the same and the cell means is spaced a distance from the window greater than twice the vertical dimension of the window.

Although the invention has been described and illustrated with respect to a preferred embodiment thereof, it is to be understood that it is not to be so limited since changes and modifications may be made therein which are within the full intended scope of this invention as hereinafter claimed.

I claim:

1. In a street lighting system of the type comprising a lighting circuit including an electric lamp and an electrical power source associated with said lighting circuit, control means for opening and closing said lighting circuit comprising photo cell means, circuit means responsive to said cell means, switch means in said lighting circuit responsive to said circuit means, and cover means including a window therein, said cell means being spaced substantially horizontally from said window and said cell means being inclined at an angle relative to the horizontal and rearwardly away from said window with the inclination thereof being sufficient for the majority of the light input to the cell means from said window to enter substantially horizontally.

2. In a street lighting system of the type comprising a lighting circuit including an electric lamp and an electrical power source associated with said lighting circuit, control means for opening and closing said lighting circuit comprising photo cell means, circuit means responsive to said cell means, switch means in said lighting circuit responsive to said circuit means, and cover means including a window therein, said cell means being spaced substantially horizontally from said window and said cell means being inclined at an angle relative to the horizontal and rearwardly away from said window whereby minimizing the light accumulated thereon other than from a horizontal direction.

3. In a street lighting system of the type comprising a lighting circuit including an electric lamp and an electrical power source associated with said lighting circuit to energize said lamp when said lighting circuit is completed, and an electrical control circuit including photoelectric cell means and a coil, said photoelectric cell means being operable responsive to changes of light falling thereon to change the electrical current through said control circuit and the magnetism of said coil; the improvement in said street lighting system of control means for turning said lamp "off" and "on" comprising a plate pivotally mounted for movement between a raised position and a lowered position, said plate being disposed adjacent said coil and operable responsive to the magnetism of said coil, means biasing said plate towards said raised position for actuation towards said lowered position by the magnetism of said coil, an upstanding end piece fixedly mounted on said plate for movement therewith, said end piece being provided with a slot therethrough, a switch interposed in said lighting circuit for opening and closing the lighting circuit; said switch including a stationary contact, a resilient conductor arm fixedly supported adjacent one end of the arm, and a movable contact fixedly mounted on said conductor arm for movement therewith; said conductor arm being bendable between a closed switch disposition in which said movable contact is in engagement with said stationary contact and an open switch disposition in which said movable contact is substantially spaced from said stationary contact, a resilient actuating arm fixedly supported adjacent said conductor arm and extending through the slot in said end piece thereby being movable responsive to movements of said plate, said actuating arm being provided with an opening therein, said conductor arm being bendable through said opening between said closed switch disposition and said open switch disposition, said conductor arm when in said closed switch disposition being disposed on one side of said actuating arm and when in said open switch disposition being disposed on the other side of said actuating arm, said conductor arm being disposable in a dead-center disposition intermediate said closed and open switch dispositions, a resilient U-shaped member interposed between said actuating arm and said conductor arm for operably coupling said actuating arm and said conductor arm, said conductor arm and said U-shaped member being responsive to movement of said actuating arm and being arranged for storing up energy before passing said dead-center disposition without changing the switch disposition and thence suddenly snapping the conductor arm into the opposite switch disposition after passing said dead-center disposition, said plate being shiftable to said lowered position responsive to an increase in the magnetism of said coil beyond a definite amount whereby to cause said conductor arm to bend to said open switch position to open said lighting circuit, and said plate being shiftable to said raised position by said biasing means responsive to a decrease in the magnetism of said coil below a definite amount whereby to cause said conductor arm to bend to said closed switch disposition to complete the said lighting circuit.

4. In a street lighting system of the type comprising a lighting circuit including an electric lamp and an electrical power source associated with said lighting circuit to energize said lamp when said lighting circuit is completed, and an electrical control circuit including photoelectric cell means and a coil, said photoelectric cell means being operable responsive to changes of light falling thereon to change the electrical current through said control circuit and the magnetism of said coil; the improvement in said system of control means for turning said lamp "off" and "on" including a snap-acting switch means, said snap-acting switch means being interposed in said lighting circuit for opening and closing the lighting circuit, said snap-acting switch means being quickly and positively shiftable in opposite directions past a dead-center position between open and closed positions, means for biasing said snap-acting switch means to said closed position, cover means disposed over said photoelectric cell means, said cover means including a window therein, said cell means being spaced substantially horizontally from said window and said cell means being inclined at an angle relative to the horizontal and rearwardly away from said window with the inclination thereof being sufficient for the majority of the light input to the cell means from said window to enter substantially horizontally, said snap-acting switch means being shiftable to said open position responsive to an increase in the magnetism of said coil beyond a definite amount whereby the lighting circuit is caused to open at a definite light intensity falling on said photoelectric cell means, and said snap acting switch means being shiftable to said closed position by said biasing means responsive to a decrease in the magnetism of said coil below a definite amount whereby the lighting circuit is caused to be completed at a definite light intensity falling on said photoelectric cell means.

References Cited in the file of this patent

UNITED STATES PATENTS

| | | |
|---|---|---|
| Re. 19,199 | Knowles | June 5, 1934 |
| 1,935,698 | Decker et al. | Nov. 21, 1933 |
| 2,182,987 | Hopkins | Dec. 12, 1939 |
| 2,243,600 | Hulst | May 27, 1941 |
| 2,545,331 | Works | Mar. 13, 1951 |
| 2,755,392 | Garnick | July 17, 1956 |
| 2,774,015 | White | Dec. 11, 1956 |
| 2,776,357 | Porath | Jan. 1, 1957 |
| 2,913,637 | Bayley | Nov. 17, 1959 |

FOREIGN PATENTS

| | | |
|---|---|---|
| 159,650 | Sweden | July 16, 1957 |

OTHER REFERENCES

"Relay Engineering," 1945, pub. by Struthers-Dunn, Inc., Philadelphia, Pa., pp. 212–214 and 342–343.